United States Patent [19]
Kiefer et al.

[11] 3,830,630
[45] Aug. 20, 1974

[54] APPARATUS AND METHOD FOR ALCOHOLIC BREATH AND OTHER GAS ANALYSIS

[75] Inventors: Michael E. Kiefer, Raleigh, N.C.; Stanford B. Spracklen, San Juan Capistrano, Calif.

[73] Assignee: Trienco, Inc., Raleigh, N.C.

[22] Filed: June 21, 1972

[21] Appl. No.: 264,956

[52] U.S. Cl. ............ 23/232 E, 23/254 E, 128/2.08
[51] Int. Cl. .... A61b 5/08, G01n 31/12, G01n 33/16
[58] Field of Search ........... 23/232 E, 254 E, 255 E; 73/27 R; 340/237 R; 128/2 R, 2.08

[56] References Cited
UNITED STATES PATENTS

| | | | |
|---|---|---|---|
| 2,633,737 | 4/1953 | Richardson | 23/254 E X |
| 3,459,508 | 8/1969 | Miczka | 23/232 R |
| 3,552,930 | 1/1971 | Borkenstein | 23/254 R |

OTHER PUBLICATIONS
G. Freund, Biochemical Factors in Alcoholism, 1967, pp. 89–95.

*Primary Examiner*—Robert M. Reese

[57] ABSTRACT

A gas detecting apparatus and method for qualitatively and quantitatively analyzing a gas for a particular constituent depends on sampling of the gas until the level of one constituent can be detected at some predetermined level; then when this level is attained measuring the gas for the presence of another constituent. Measurement of human alcohol content is achieved by first measuring several samples of the $CO_2$ level in the breath and when the $CO_2$ reaches a predetermined minimum level, corresponding to a true lung sample, the apparatus responds and the alcoholic content is measured. A detecting filament bridge configuration measures alcoholic content by catalytic combustion of the alcohol and oxygen over a platinum filament.

12 Claims, 4 Drawing Figures

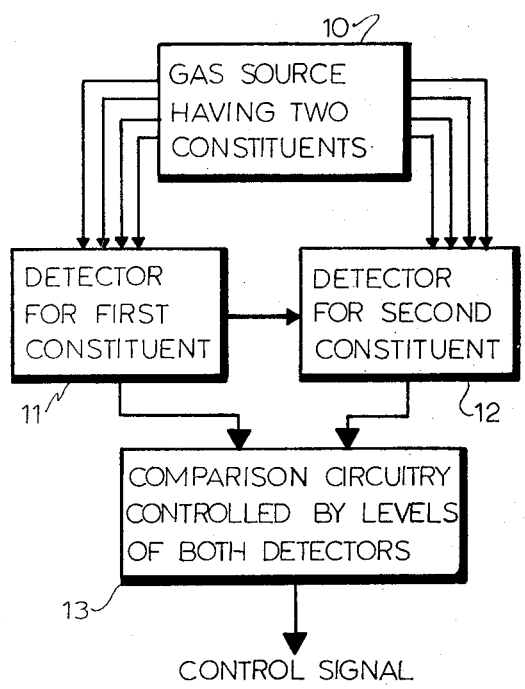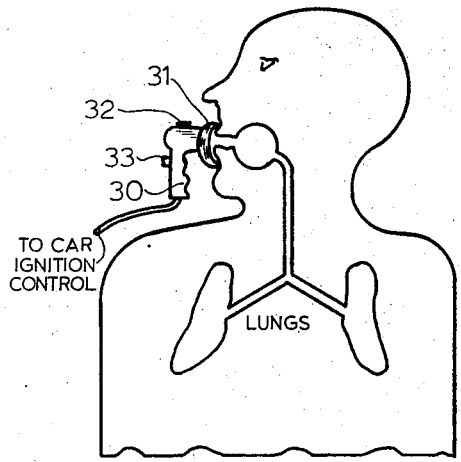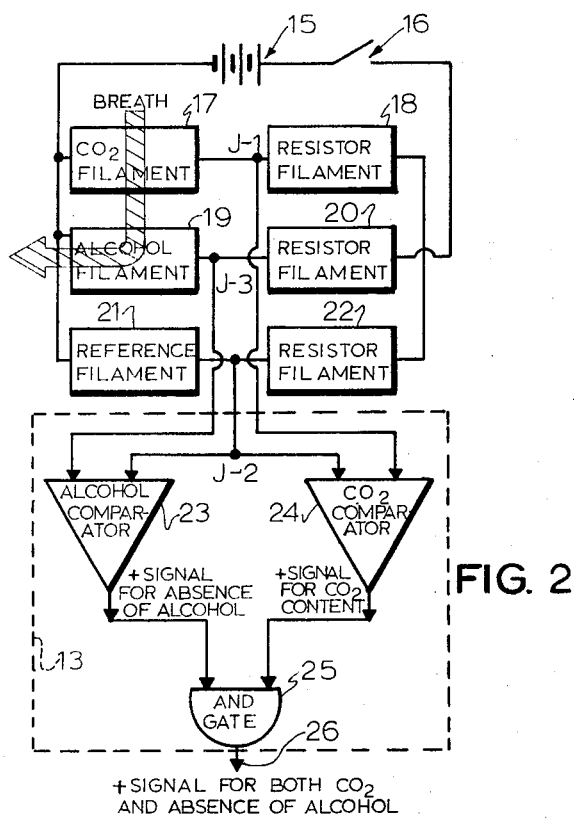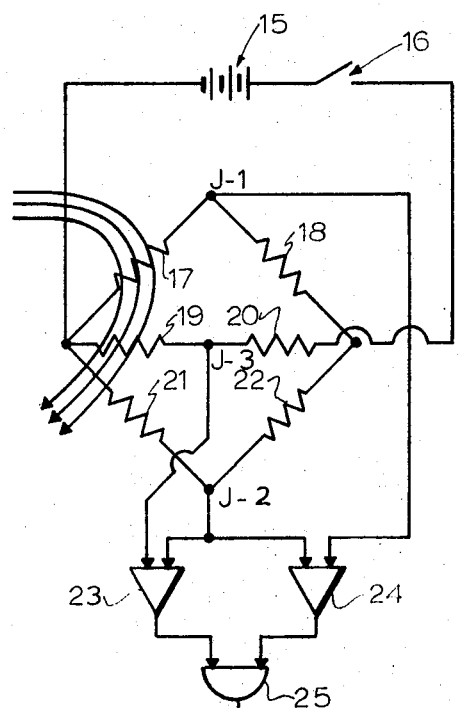

APPARATUS AND METHOD FOR ALCOHOLIC BREATH AND OTHER GAS ANALYSIS

BACKGROUND OF THE INVENTION

1. Field of the Invention

The invention relates to gas analysis apparatus and methods and particularly to gas analyzing apparatus and methods using detecting filaments arranged in electrical bridge configurations. While of broader significance, the invention is more specifically concerned with apparatus and methods for determining excess levels of alcohol consumption by humans.

2. Description of the Prior Art

In regard to the general problem of testing for alcohol content in the human, there is generally a measurement of the volume of breath, a separation and isolation of the alcohol from the breath specimen and a measurement of the amount of the isolated alcohol. Numerous ways have been devised for isolating the alcohol and also for measuring the quantity of alcohol. In the use of conventional alcohol breath testing unit, it is known that accurate measurements depend on the obtaining of what is called a sample of the alveaolar air which means air obtained from the deepest part of the lungs and which has come to equilibrium with the blood. The standard breath testing unit operates on a concept of obtaining the air sample by having the subject exhale into a tube and by having the breath sample react with a chemical reagent to produce a color intensity which can be read and converted into alcoholic content.

Various relatively complex test procedures are necessary for use of the conventional breath testing unit and the reagents employed must be prepared by a qualified chemist. Furthermore, the time required to conduct an individual test is often prolonged because of a lack of experience on the part of the operator or because of the general difficulty in using the conventional testing unit. Thus, the conventional breath testing unit has improved the art substantially but has not offered a completely satisfactory solution to the problem.

It is also known to analyze gas by causing the gas to pass over a metallic filament arranged in an electrical bridge configuration and allow the thermal conductivity character of the unknown gas to affect the electrical character of the filament and thereby unbalance the bridge to give an electrical reading indicative of some unknown character of the gas either in terms of quality or quantity. Gas chromatographs operate in conjunction with such so-called thermal conductivity detectors and may use platinum, iridium, tungsten, nickel, gold, silver and other metals in the filaments. For background, reference is made to copending application entitled "Chamber and Filament Structure and Method for Flow Through Thermal Conductivity Micro Size Measuring Chambers", Ser. No. 143,836, filed May 17, 1971, now U.S. Pat. No. 3,704,984.

In the use of thermal and equivalent detectors, it is the common practice to search for and measure only a specific constituent in a particular gas. It has not been known to sample a gas source for several samples, pass these samples over a filament detector until the samples indicate the presence of a particular gas at a particular level and upon this level being achieved cause the samples to be further detected for another constituent of the same gas. More particularly, it has not been known to sample human breath by a filament type bridge until a $CO_2$ level is measured which indicates that (1) the breath contains alcohol, (2) the level is high enough to indicate that both the breath and the blood of the person being measured are essentially equally saturated and (3) the level of alcohol is sufficiently high to deserve measuring the alcohol content of the breath, and then to follow this $CO_2$ measurement by measuring the samples for alcohol content by passing the sample over other filament-bridge type detecting apparatus.

As further background, it can be shown that the $CO_2$ concentration in the breath varies widely as compared to the concentration of methyl alcohol, acetaldehyde, acetone, and like trace constituents. Thus, the thermal conductivity of such trace constituents closely corresponds to air. Since $CO_2$ has a vastly different thermal conductivity from that of the trace constituents, the $CO_2$ acts independently of the trace constituents. The breath mixture for practical purposes responds in a thermal conductivity sense as a binary mixture of $CO_2$ and air.

From what has been described above, it can be seen that conventional methods and apparatus do not provide satisfactory answers to the increasing demand for fast and accurate measurement of alcoholic content. In other areas there are equally important needs for comparative gas contents, e.g., the need to measure acetone content in the breath of a diabetic, the need to measure relative carbon monoxide or methanol content, or the need to measure anesthetic absorption during an operation. There is also a specific need for a breath measuring system and method which has the facility for discriminating between air obtained from the mouth, throat and lungs and such discrimination is not obtained in the prior art apparatus and methods. Furthermore, the prior art apparatus in most cases has an undesirable dependency on having the cooperation of the person being tested, e.g., a sick or drunk person, whereas it would be more desirable to be able to quickly perform the test even though the person tested is not being cooperative.

SUMMARY OF THE INVENTION

The apparatus and method of the invention use analysis of human breath for alcohol content as an example. The apparatus is basically an electrical multi-filament bridge detector arranged so that samples of breath can be drawn both across a $CO_2$ detecting filament and an alcohol detecting filament. The $CO_2$ signal is fed to a $CO_2$ comparator which produces a positive output signal in the presence of $CO_2$ at a prescribed level and which level also allows a separate alcohol comparator to function. The alcohol comparator produces a positive signal in the absence of alcohol above a predetermined level. The outputs of the $CO_2$ and alcohol comparators are fed to an "And" gate. In the presence of $CO_2$ above a predetermined level and the absence of alcohol above a predetermined level, a positive signal is produced by the And gate. While disclosed in connection with measuring alcoholic content in the breath, the invention applies equally well to analyzing other gas sources having two related constituents of interest. The invention is specifically directed to those gas sources in which any constituents, in addition to the two related constituents of interest, are in insignificant concentrations and of insignificant thermal conductivity effect as compared to the two constituents of interest.

DESCRIPTION OF THE DRAWINGS

FIG. 1 is a generalized schematic diagram of the apparatus of the invention.

FIG. 2 is a schematic diagram of the invention as applied to measuring alcohol content.

FIG. 3 is a schematic diagram of the invention applied to a mask for controlling car ignition.

FIG. 4 is a schematic electrical diagram of the circuit employed.

DESCRIPTION OF THE PREFERRED EMBODIMENTS

As schematically illustrated in FIG. 1, the invention is directed to analyzing a gas having two elements of related interest. As an example, it is known that the breath of a person who has consumed alcohol will contain both the usual $CO_2$ and traces of the alcohol. It is also known that air which has been fully inhaled into the lungs will reveal at least 4½% by volume $CO_2$ content. Furthermore, a breath sample which has been fully inhaled and then exhaled will provide a true sample of alcohol not only in the breath but in the blood. This is so since tests have shown that the $CO_2$ and alcohol content in the breath are both essentially in equilibrium with that in the blood when the $CO_2$ measures 5 to 5¼% by volume. For accurate measure of the alcohol content in the breath there must thus be at least 4½% $CO_2$ by volume in the breath.

In a generalized sense, the apparatus and method of the invention are illustrated in FIG. 1 and are directed to obtaining representative samples of breath from the lungs, the gas source 10, directing these over a first detector 11 which senses and detects the first constituent, the $CO_2$, and upon the obtaining of a predetermined level, 4½% allows a second detector 12 to sense and measure the second constituent, the alcohol, by reason of the same samples being directed to the second detector. In the presence of the $CO_2$ at or above the level of 4½% and with the presence of alcohol as sensed by the second detector the comparator circuitry 13 then indicates the presence of alcohol, or conversely, the absence with a different signal.

In FIG. 2, there is shown in block diagram form and in FIG. 4 in electrical diagram form an electrical bridge and comparator circuit suited to the invention. The circuitry includes a direct current battery source 15, a switch 16, filaments 17, 18, 19, 20, 21 and 22, comparators 23 and 24, and And gate 25 and an output terminal 26, all being electrically arranged as illustrated in FIG. 2.

Filament 17 detects the $CO_2$ and in the presence of $CO_2$, whose thermal conductivity is low, filament 17 will grow hotter and its resistance will increase. Filament 17 must not be catalytically active, since it should respond to $CO_2$ but not alcohol. Gold, silver and tungsten are suitable materials for such a filament. Filaments 18 and 22 act as a voltage divider and may be of gold. Filament 20 serves to complete the bridge and may be of platinum. Filament 21 is a reference filament and useful for adjusting ambient temperature to which gold is suited as a filament material. Comparators 23 and 24 may take the conventional form of comparison circuitry as may the And gate 25.

In use, the described circuitry may, for example, be embodied in a hand-held device such as illustrated in FIG. 3. The subject holds the grip 30, presses the on-off switch 33, and is directed to breath into the mouth piece 31 for three to five breaths. During this period, the device of the invention will both detect and quantitatively measure the $CO_2$ content of the captured breath by directing it over the $CO_2$ detector filament 17. While the breath is also initially directed over the alcohol filament 19, filament 19 is essentially ineffective unless and until the $CO_2$ content reaches the 4½% level. This is so because the electrical balance of the bridge, made up of filaments 17, 18, 21 and 22, is controlled by filament 17. Thus, the voltage across filament 19 is controlled by the electrical state of filament 17 and filament 17 is purposely designed so that a 4½% $CO_2$ content in the breath sample causes filament 17 to unbalance the bridge of which it is a part and to place the alcohol detecting filament 19 in a detecting state. The output signal may be converted to energize a lamp 32 or control an auto ignition according to the prescribed levels of alcohol content, as shown in FIG. 3 by example.

Referring back to FIGS. 2 and 4, the comparator 34 effectively compares the voltage level at junction J-1 with the voltage level at junction J-2. Since the junction J-1 corresponds to the $CO_2$ level, comparator 24 is designed to produce a positive signal when the $CO_2$ level is at least 4½%. Once filament 17 is detecting a 4½% $CO_2$ sample it means that filament 19 is prepared to detect for alcohol content by catalytic oxidation of the alcohol over filament 19. Comparator 23 now compares the level at junction J-3 with that at J-2 and comparator 23 is designed to produce a positive signal in the absence of alcohol. The signals for comparators 23 and 24 are fed to the And gate 25 which is designed to produce a positive signal when gate 25 receives positive signals from both comparators 23 and 24. Thus, gate 25 produces a positive signal when $CO_2$ is present in the sample above 4½% and alcohol is also absent.

As other examples for application of the invention, it may be noted that in many atmospheres either phosphorous or chlorine exists in trace amounts as the results of many different chemical activities; however, when nerve gas, which is a very peculiar compound containing both phosphorous and chlorine, is present in an atmosphere, and an analysis is being made for each of these elements separately and both should occur, a subsequent alarm system should react to advise that a potentially hazardous condition exists, which far exceeds the hazard of the presence of either of the compounds mentioned.

Another application exists where during an operation oxygen is fed to the patient under controlled conditions and a gaseous anesthetic is employed, the anesthesiologist is required to sit and monitor both the oxygen and the level of anesthetic in the expired air to be certain of the patient's condition. Under the system of the invention, the oxygen level can be monitored continuously and when it either exceeds or is below a predefined limit, the amount of anesthetic can be increased or decreased.

From the foregoing, it can be seen that the samples may be in the nature of a continuous gas stream or in the nature of discontinuous discrete samples, e.g., human breath. Looked at generally, it may also be observed that while the bridge-filament type detector is peculiarly adapted to the invention, optical, ultra-violet and other types of detectors may be employed in conjunction with appropriate comparative circuitry. Furthermore, the readout may take any desired form, such as an indicating light, a meter or other type of visual display, or a recording device.

We claim:

1. In a gas analysis system:
   a. a gas source having first and second constituents of interest, being of a type where a true sample depends on the first constituent being present in some predetermined quantitative percentage X and adapted when so required to provide successive samples until such a percentage X is obtained;
   b. first electrical detecting means adapted to detect the first but not the second constituent and arranged to receive successive samples from said source and upon said percentage X of said first constituent being obtained to produce a first electrical control level at a selected first junction;
   c. second electrical detecting means adapted to detect the second constituent arranged to simultaneously receive equivalent said samples from said source and connected to said first detecting means such that its ability to detect the second constituent is dependent upon the presence of said first control level at said junction and upon said second constituent being present said second detecting means being adapted to produce a second electrical control level at a selected second junction having a value dependent on the quantitative percentage of said second constituent; and
   d. electrical comparator means responsive to said first and second levels and adapted to produce a control level for external control purposes only in the event of obtaining said percentage X and a measured quantitative percentage Y of said second constituent.

2. In a system as claimed in claim 1 including a housing mounting said system therein as an integral portable unit.

3. In a system as claimed in claim 1 wherein said first and second detector means comprise electrical bridge filament type detector means.

4. In a system as claimed in claim 1 wherein said source comprises a human and said gas the human breath.

5. In a system as claimed in claim 4 wherein said first constituent is $CO_2$ and said second constituent is alcohol.

6. In a system as claimed in claim 5 including an external device adapted for being controlled by said control level and means connecting said control level to said device to control the operation of said device.

7. In a system as claimed in claim 5 wherein said first and second detector means comprise components of an electrical bridge having a first leg in the nature of a filament not subject to alcoholic catalytic action for detecting said carbon dioxide and a second leg in the nature of a catalytic filament for detecting said alcohol, said breath source being caused to pass over said first and second legs in succession.

8. In a system as claimed in claim 3 wherein said percentage X is approximately 4½ percent.

9. The method of analyzing a gas having two constituents of interest comprising the steps of:
   a. flowing a sample of the gas to be analyzed past first detecting means adapted to produce a first electrical control level dependent on one of the constituents being present in the sample in a certain first predetermined quantitative percentage
   b. simultaneously flowing a similar said sample of said gas past second detecting means depending for its detecting state on the obtaining of said first control level and adapted to produce a second electrical control level having a value dependent on the quantitative percentage of the other constituent; and
   c. producing a third control level by electrical comparator means connected to and dependent upon said first and second control levels whereby said third control level electrically indicates the presence of the first constituent in at least said first percentage X and the second constituent in some other predetermined percentage Y terms, whether at, below or above Y.

10. The method of claim 9 wherein said gas is human breath, said first constituent is carbon dioxide in the breath and said second constituent is alcohol in the breath.

11. The method of claim 10 wherein said first and second control levels are produced by flowing said samples past electrical filament bridge type detectors forming part of a common bridge detecting network.

12. The method of claim 10 wherein said first percentage is approximately 4½ percent by volume carbon dioxide content.

* * * * *

UNITED STATES PATENT OFFICE
CERTIFICATE OF CORRECTION

Patent No. 3,830,630         Dated August 20, 1974

Inventor(s) Michael E. Kiefer and Stanford B. Spracklen

It is certified that error appears in the above-identified patent and that said Letters Patent are hereby corrected as shown below:

Col. 4, line 21, "comparator 34" should be -comparator 24-

Col. 6, line 20, -X;- should be inserted after "percentage"

Signed and sealed this 19th day of November 1974.

(SEAL)
Attest:

McCOY M. GIBSON JR.
Attesting Officer

C. MARSHALL DANN
Commissioner of Patents